Oct. 3, 1967  H. D. HUTCHINSON ET AL  3,345,478

FLOW RESPONSIVE SWITCH

Filed Nov. 23, 1965

INVENTORS
HAROLD D. HUTCHINSON
WILLIAM C. GREGGE
BY
Elliott & Pastoriza
ATTORNEYS 3,345,478
FLOW RESPONSIVE SWITCH
Harold D. Hutchinson and William C. Gregge, both of 1009 Montana Ave., Santa Monica, Calif. 90403
Filed Nov. 23, 1965, Ser. No. 509,328
6 Claims. (Cl. 200—81.9)

ABSTRACT OF THE DISCLOSURE

This disclosure concerns a fluid flow switch for turning on or off equipment in response to a change in fluid flow rate. A diaphragm is positioned within an enclosure and is responsive to a pressure change to effect a physical movement. This movement is transmitted to a point exterior of the enclosure by a U-shaped structure wherein the base of the U passes through a wall portion of the enclosure. One arm of the U within the enclosure is responsive to movement of the diaphragm and the other arm of the U exterior of the enclosure is arranged to operate a switch. The exterior arm end duplicates the movement of the interior arm end, the general U-shaped structure rocking about the point at which its base portion passes through the wall. Since the motion at the base portion is relatively small, proper sealing can be effected with the result that a more reliable product is provided.

---

This invention relates to flow responsive switches and more particularly to a novel switch means for insertion in a fluid flow line for indicating by means of pressure differentials the flow rate of fluid in the line.

Pressure differential responsive flow rate switches of the type under consideration are often used in fluid lines for operating auxiliary equipment or, alternatively, shutting off auxiliary equipment when the fluid flow rate through the line varies beyond a desired given flow rate. For example, certain equipment can only operate effectively if it is maintained at a given temperature. Towards this end, cooling liquid is circulated about the equipment to hold the temperature below a given value. If the cooling fluid in the line should cease flowing or the flow rate of this fluid drops below a given flow rate, the equipment may heat to a point that it can no longer operate effectively. By providing a fluid flow switch in the fluid line, the equipment may be automatically shut off in the event the flow rate should drop below a given value.

Many presently available fluid flow switch devices operate on the principle of pressure differentials created by various constructions such as orifices, blades, turbines, and so forth inserted in the fluid line. The resulting differential pressures are transformed into a net force which is a function of the fluid flow rate, the geometry of the construction, and the physical properties of the fluid. The physical movement resulting from this force must then be transmitted through the wall of the enclosure surrounding the orifice or other fluid drag system to a suitable switch or readout device. The transmitting of this physical movement through the wall of the enclosure has proved to be one of the most difficult problems in flow switch designs.

More particularly, when a diaphragm and orifice combination are employed such that physical movement of the diaphragm will occur in response to a change in the pressure differential across the orifice, the principal problem has been to transmit the movement of the diaphragm from within the enclosure to the exterior of the enclosure. If a sliding sealed shaft is employed, it is extremely difficult, if not impossible, to maintain the friction of movement of the shaft through the enclosing wall constant for different flow rates or different absolute pressures on either side of the restricting orifice. Environmental conditions and age also adversely affect the frictional forces of this type of shaft seal. As a consequence, errors are introduced in the output reading or the point at which a switch is to be actuated.

Other flow switches have proposed a paddle structure disposed in the fluid flow line, the displacement of which constitutes a function of the fluid flow rate. This displacement is transmitted to the exterior by a bellows arrangement. In these designs, however, the displacement or force exerted on the paddle or equivalent structure is not linear with flow rate. Further, the stiffness of the bellows renders the switch inaccurate for measuring very small flow rates, for example, less than five gallons per minute.

A third proposed solution is to provide a sliding magnet structure which will operate an exteriorly disposed reed type switch so that there need be no fluid seals from the interior to the exterior of the enclosure. However, the magnet itself must move in response to the differential pressure and thus must be suitably sealed and yet be capable of the desired movement. Again, there is introduced friction as a result of the movement of the magnet, which friction may vary over the range of differential pressures involved as well as change due to environment and age.

Other problems with presently available flow switches concern the relatively limited range of flow rates over which the switch will operate. The ranges could be extended by varying the orifice size, but such an operation requires generally a completely new switch and casing structure. A range of indication of which the switch is capable may also be realized by varying the restoring force opposing the physical movement of a diaphragm or similar structure taking place within the enclosure. Again, however, there is usually involved the disassembly of the entire switch for adjustment of the force restoring means or even replacement thereof. Further, there has not been available any suitable indicating means for enabling an operator to observe the degree of restoring force being applied so that it is difficult to reset the switch operating mechanism to a desired flow rate in a consistent manner.

Still another problem with flow switches is the inability to monitor the physical condition of the switch. For example, if a component of the pressure responsive structure in the switch itself should fail, the actuation of the switch could occur even though there is no appreciable change in the flow rate. There is no ready means for an operator to detect whether the failure is in the pressure responsive structure itself or in the electrical portion of the switch and circuit leading from the switch to the equipment to be operated or turned off. It would be desirable if a ready means were provided to enable an operator to observe the mechanical condition of the flow switch at all times so that any malfunctioning may be easily isolated.

Bearing the above in mind, it is a primary object of this invention to provide a vastly improved pressure differential responsive fluid flow switch which overcomes and, to a large extent, completely eliminates the foregoing problems.

More particularly, it is an object to provide a novel flow responsive switch in which a physical motion resulting from a pressure differential in a fluid line is transmitted to the exterior of the line without any sacrifice in the distance of displacement of the motion and without introducing any appreciable friction, all to the end that accurate and repeatable flow rate indications can be realized over a wide range of flow rates.

Another important object is to provide a pressure differential responsive flow rate switch means which is readily adjustable in a continuous manner to vary the range of flow rates at which the switch is actuated.

An auxiliary object in conjunction with the foregoing object is to provide a visual indicating means of such adjustment so that the flow switch may be reset in a consistent manner for a particular flow rate.

Still another important object is to provide a novel pressure differential responsive flow rate switch including means enabling monitoring of the physical condition or mechanical action of the switch so that any difficulties in the system in which the switch is employed can be readily isolated to either the mechanical properties of the pressure responsive mechanism itself or the switch and associated electrical circuit.

Another object of this invention is to provide an improved flow responsive switch capable of operating over an extremely large range of flow rates all to the end that a single switch structure can be employed in many more applications than heretofore possible.

Briefly, these and many other objects and advantages of this invention are attained by providing a suitable enclosure having inlet and outlet means for insertion in a fluid line. This enclosure includes a restricted portion defining orifice means through which the fluid passes, the restriction dividing the enclosure into first and second chambers. The differential pressure created in these chambers as a consequence of the orifice is converted into a physical movement within the enclosure by means of a diaphragm. This physical movement in turn is brought out to the exterior of the enclosure by a unique motion transmitting means preferably in the form of a U-shaped assembly adapted to rock about a pivot point in a wall portion of the enclosure. This rocking action takes place in the plane of the U-shaped member so that the far ends of the U arms execute identical motions, one within the enclosure and the other exterior of the enclosure, the base portion of the U passing through the enclosure wall. The motion of the base portion of the U is thus very slight, and a suitable annular seal is disposed about this portion of the U to provide complete sealing and yet permit rocking action with very low restoring force and very low friction.

The structure also contemplates the provision of suitable adjusting means for a bias force applied to the exterior arm of the U-shaped member opposing the force provided by the diaphragm so that a wide range of flow rates may be indicated. In addition, there is provided visual means enabling observation of the mechanical positioning of the motion transmitting means and thus providing a means for continuously monitoring the position of the diaphragm so that a quick inspection of the device will reveal any mechanical malfunctioning.

A still additional feature of this invention includes a novel orifice defining member in the form of a cylindrical body in which there are provided a plurality of orifices of different diameters. The arrangement is such that any one of the plurality of orifices may be positioned between the first and second chambers within the enclosure so that the fluid flow range of the switch for any one orifice can be extended by providing a different sized orifice.

A better understanding of the invention will be had by now referring to a preferred embodiment as illustrated in the accompanying drawings, in which.

Figure 1:
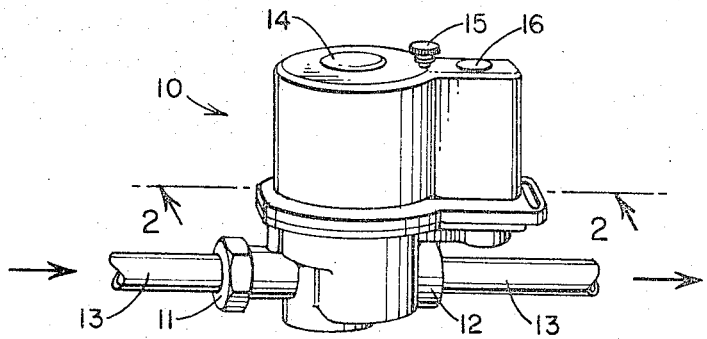
FIGURE 1 is a general perspective view of the pressure responsive switch inserted in a fluid line.

Referring first to FIGURE 1, the pressure responsive flow switch is indicated generally by the numeral 10 and includes an enclosure having an inlet 11 and an outlet 12 for insertion into a fluid line 13. On the upper portion of the structure, there is provided a window 14 constituting part of an indicating means for indicating the degree of adjustment of the device and a manually removable screw 15. A second window 16 is also provided to enable monitoring of the operation of the flow switch visually.

In the particular application of the flow switch under discussion, the structure of FIGURE 1 includes a means responsive to a change in flow rate to actuate a switch. This switch may function to turn off certain equipment in the event that the flow rate drops below a given preset value so that if the fluid line constituted part of a cooling system, the switch 10 could be employed to turn off equipment being cooled, should the fluid flow rate of cooling liquid drop below such given value.

Figure 2:
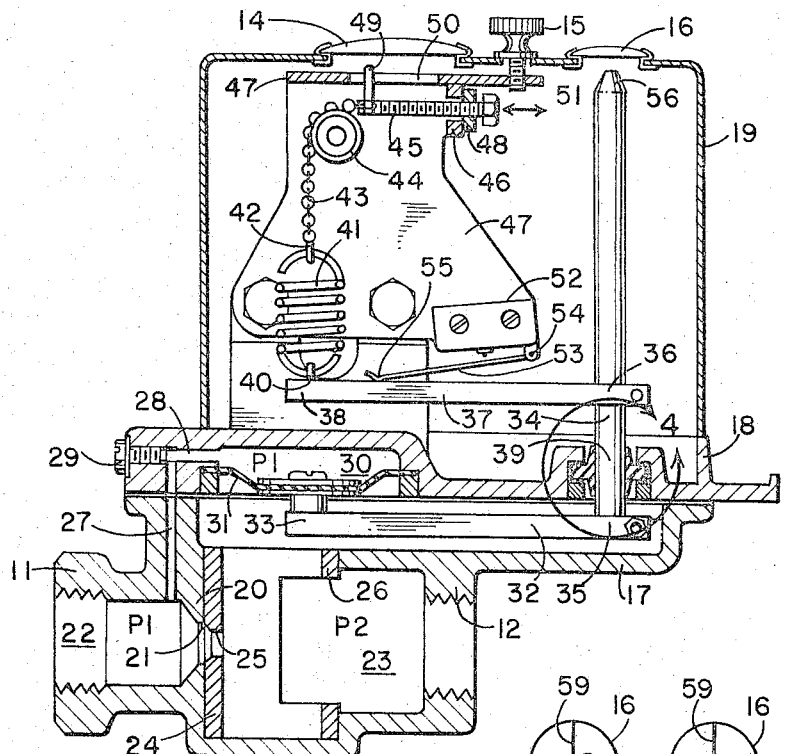
FIGURE 2 is an enlarged cross section of the switch of FIGURE 1 looking in the direction of the arrows 2—2.

Referring now to FIGURE 2, details of the flow responsive switch will be described. Referring first to the lower portion of FIGURE 2, it will be noted that the enclosing structure including the inlet 11 and outlet 12 is defined by a lower casting 17 and an upper casting 18. Mechanism exterior of the enclosure defined by the castings may be protected by a suitable cover 19 incorporating in its top surface the windows 14 and 16 and held in place by the screw 15.

The interior of the enclosure between the inlet and outlet openings includes a restricting portion 20 defining a single opening 21 constituting part of an orifice means. This structure divides the interior of the enclosure into first and second chambers 22 and 23, respectively. Fluid flowing into the inlet 11 will thus pass through the orifice 21 from the chamber 22 to the chamber 23 and thence through the outlet 12. There will be developed, accordingly, a pressure differential across the orifice means so that the pressure P1 in the first chamber 22 will be greater than the pressure P2 in the second chamber 23.

In accordance with a feature of this invention, the orifice means additionally includes a cylindrical body 24 provided with a plurality of orifices, one of which is shown at 25 in registration with the single opening 21. The diametrically opposite side of the cylindrical body is open at 26. This structure will be described in greater detail as the specification proceeds.

The first chamber 22 communicates through a vertical passage 27 and a lateral passage 28, the left end of which is closed by a screw plug 29, with an auxiliary chamber 30. The chamber 30 may be deemed part of the first chamber 22 because of this communication by the passages so that the chamber 30 will have the pressure P1. A diaphragm 31 is disposed as shown to define an end wall of the chamber 30 and separate the first and second chambers 22 and 23. The diaphragm 31 is thus subject to the differential pressure of these chambers and constitutes essentially a means responsive to the differential pressure for effecting a physical movement within the enclosure.

Cooperating with the diaphragm 31 is a motion transmitting means for transferring the motion of the diaphragm to the exterior of the enclosure defined by the castings 17 and 18. This motion transmitting means is in the form of a U-shaped frame having a first arm 32 with one end coupled to the center of the diaphragm 31 as at 33 and its other end rigidly secured to a vertically extending member 34 as at 35. The member 34 which constitutes the base of the U-shape extends through a wall portion of the enclosure and is rigidly connected at 36 to an arm 37 constituting the second arm of the U-shape, its far end 38 being positioned directly above the end 33 of the first arm. At the wall pass-through point of the base of the U, there is provided a pivot structure designated generally by the numeral 39 which will permit rocking movement of the U-shaped frame in its own plane so that the end 38 of the second arm will follow identically the motion of the end 33 of the first arm connected to the diaphragm 31.

The end 38 of the second arm is connected at 40 to a biasing means in the form of a spring 41. The other end of the spring 41 is connected at 42 to a chain 43 passing over a pulley 44 and having its upper end connected to a screw 45. The screw 45 passes through an opening 46 in a supporting frame 47. A nut 48 is threaded to the far end of the screw 45 such that rotation of the nut will move the screw back and forth relative to the frame opening. An indicator pointer 49 riding in a slot 50 in the upper portion of the frame 47 serves the dual function of enabling visual observation through the window 14 of the position of the end of the screw 45 and of keying the traveling screw so that the same will not rotate when the nut 48 is rotated.

The foregoing arrangement constitutes an adjusting and indicating means for adjusting the flow rate and thus the value of the differential pressure across the diaphragm 31 necessary to move the U-frame structure. In other words, the spring 41 biases the second arm 37 in an upward direction so that the first arm end 33 tends to move the diaphragm 31 upwardly in opposition to the greater pressure P1. When the nut 48 is rotated such as to decrease tension on the spring 41, the flow rate or differential pressure at which physical movement of the diaphragm and thus the motion transmitting means takes place will be decreased.

As shown in the central portion of FIGURE 2, the supporting frame plate 47 also supports a microswitch 52 arranged to be actuated by a lever 53 pivoted at 54. The left end of this lever engages the end portion of the second arm 37 of the U-frame as at 55. With this arrangement, it will be clear that when the U-shaped frame rocks upwardly, the lever 53 is moved towards the switch 52. If the switch is a normally open switch, the switch 52 will thus close and energize an alarm or control other electrically connected components to automatically turn off equipment. The switch 52, however, may be a normally closed switch so that engagement by the lever 53 when the second arm 37 moves upwardly towards the switch, will open a circuit to shut down equipment directly connected to the switch when the flow rate drops below a desired value.

In FIGURE 2, it will be noted that the vertical portion 34 of the base of the U-frame passing through the enclosure wall extends upwardly to terminate at 56 beneath the viewing window 16. The position of the end 56 relative to an indexing line on the window 16, serves as a monitoring means for enabling visual inspection of the physical position of the U-shaped frame and thus the physical position of the diaphragm 31. The purpose of this type of indication will become clearer as the description proceeds.

Figures 3, 4, 5, 6, 7:
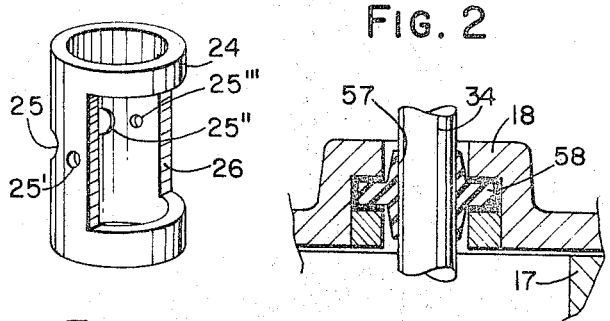
FIGURE 3 is a perspective view of a novel orifice adjusting means in accordance with the invention.
FIGURE 4 is an enlarged fragmentary cross section partly in full lines of a portion of the structure enclosed within the circular arrow 4 of FIGURE 2; and, FIGURES 5, 6, and 7 are schematic plan views illustrating the manner in which monitoring of different mechanical conditions of the flow switch is realized.

Referring now to FIGURE 3, the cylindrical body 24 constituting part of the orifice means described in FIGURE 2 is shown in greater detail. This body includes a plurality of orifices such as 25', 25'', 25''', in addition to the orifice 25. These orifices are disposed along a circumferential line midway between the upper and lower ends of one wall of the cylindrical body. The diametrically opposite wall opening 26 covers a considerable circumferential extent as shown. With this arrangement, it is possible to manually rotate the body to position any one of the plurality of orifices in registration with the single opening 21 described in FIGURE 2 and still have the opposite diametric wall of the cylindrical body 24 in communication with the second chamber 23 and outlet 12.

FIGURE 4 illustrates in greater detail the pivot 39 for the U-shaped member. As shown, the U-portion 34 passes though clearance openings in the enclosure defined by the castings 17 and 18. To sealingly support the U-shaped frame for rocking action, the mid-portion of the member 34 is bonded as at 57 to an annular resilient seal 58. With this arrangement, the base of the U-member is relatively stiff to axial loading, but offers little resistance to rocking movement about the resilient seal 58. Further, since the motion is generated at the ends of the arms of the U, the actual movement of the central portion of the member 34 at the point it passes from the enclosure is relatively small so that the small friction involved in such movement is constant throughout this motion even though the extent of movement of the ends of the U-arms may be relatively large.

It should also be appreciated from the geometry of the U-shaped motion transmitting means described in FIGURE 2 such that end 38 of the second arm 37 will follow the identical motion of the end 33 of the first arm 32 within the enclosure, so that the motion of the diaphragm is accurately transmitted to the point 38.

FIGURES 5, 6, and 7, respectively, illustrate the different positions of the end 56 of the indicating extension of the member 34 from the base of the U-shaped frame. As shown, there is provided a diametric hairline 59 on the window 16. When viewing the switch from above through the window 16, if the end 56 appears to the right of the hairline, it will be evident that the U-shaped frame member has been rocked in a clockwise direction about the pivot structure 39 as viewed in FIGURE 2 thus indicating that the differential pressure across the diaphragm 31 has dropped to in turn indicate that the flow rate has decreased. On the other hand, when the indicating end 56 is centered on the diametric line 59, the U-shaped frame is in a desired central position wherein the force exerted by the diaphragm 31 for a desired flow rate is balanced by the pre-set force exerted by the spring 41. In this condition, the device is operating normally. In FIGURE 7, the indicating end 56 is illustrated to the left of the hairline 59 thus indicating that the flow rate has increased above its normal value.

With the foregoing general description of the components making up the flow responsive switch in mind, its complete operation will now be described. Initially, one of the several orifices 25, 25', 25'', or 25''' is positioned in the casting 17 prior to assembly of the casting 18 thereon to register with the single opening 21. The particular orifice disposed in registration with the single opening 21 will depend upon the flow rate through the line. Assume for purposes of describing the operation that the fluid line 13 of FIGURE 1 constitutes part of a cooling system for equipment and that it is desired to turn off the equipment by closing the microswitch 52 if the flow rate of cooling fluid through the line 13 drops below a given flow rate. In this event, an orifice will be chosen such that the pressure differential thereacross for the desired flow rate of cooling fluid in the line 13 will fall approximately midway within the range of counter-forces available by the spring 41 on the U-shaped member throughout its limits of adjustment. The various orifices are graded such that the change of differential pressure from one to the other is within the range of adjustment of the restoring force exerted by the biasing spring 41.

Once the proper orifice has been selected, the switch assembly is bolted together so that the castings 17 and 18 define the fluid enclosure as described. With fluid now flowing through the line 13 in a normal manner, there will result a pressure differential across the selected orifice which will result in physical movement of the diaphragm 31 to a position wherein the second arm 37 of the U-shaped frame is in a center or neutral position so that the microswitch 52 remains open. If the flow rate increases to increase the differential pressure, the first arm 32 of the U-shaped frame will rock downwardly and be followed by the second arm 37 so that the second arm will move further away from the switch 52. The movement away from the switch will be limited by the spring 41 which will exert an ever increasing restoring force so that an equilibrium point will be reached where the tension in the spring 41 exactly counters the force resulting from the differential pressure across the diaphragm. There is thus insured an arrangement wherein the switch 52 will not be operated, provided the fluid flow remains at or is greater than a given value.

If now the fluid flow should decrease to a point where it cannot effectively perform its cooling function or, for that matter, should the flow stop altogether, the pressure differential across the diaphragm 31 will decrease so that the spring 41 will move the second arm 37 upwardly to engage the end 55 of the switch lever 53 thereby closing the switch 52. Closing of the switch 52 will then energize suitable control circuits to shut down the equipment being cooled by fluid in the line 13 or operate an alarm so that manual action can be taken to shut down the equipment.

It will be evident that by unthreading the knob 15, and removing the cover 19 to expose the nut 48, the tension on the spring 41 may be adjusted by rotating the nut. By decreasing this tension, a greater decrease in fluid flow is necessary to actuate the switch 52. By increasing the tension, less of a drop in fluid flow is necessary to actuate the switch 52. Thus, the nut 48, screw 45, and spring 41 enables an adjustment to a given flow rate, below which the switch 52 will be operated.

As stated, the range of given flow rates is limited by the orifice size to a given range. If it is desirable to effect adjustments in other ranges, a different sized orifice is inserted into registration with the single opening 21, all as described heretofore.

Should the equipment stop operating for some reason, such as malfunctioning in the electric switch 52, or in the associated electrical circuit, it would ordinarily not be possible to determine the cause of the shut down of the equipment with a conventional type flow switch. However, with the switch of the present invention, when a shut down occurs, the operator need only observe the indicating end 56 through the window 16. If the indicating end 56 is to the right of the hairline 59 as shown in FIGURE 5 or in a center position such as shown in FIGURE 6, he will know that the switch 52 has not been operated as a consequence of lack or slow down of fluid flow but rather because of some electrical malfunction. On the other hand, if the indicating end 56 appears to the left of the hairline 59, he will know that the equipment was properly shut down by operating of the flow switch as a consequence of a slowing down of the flow rate below the minimum allowed value.

From the foregoing description, it will thus be evident that the present invention has provided a greatly improved flow responsive switch. The rigid U-frame constituting the motion transmitting means for transmitting the motion of the diaphragm to a point external of the fluid enclosure constitutes an extremely important feature of this invention in that the motion is transmitted by a rocking action about a given point wherein there is a minimum of motion so that a fluid-tight seal can be maintained with very little friction. The structure, on the other hand, can withstand large axial forces as a consequence of, for example, a high pressure P2. In other words, the portion passing through the wall is stiff in this direction whereas it is extremely pliable as far as rocking motion is concerned. This desirable result is a consequence of the creation of the new and novel combination of the shaft seal and hinge which provides a means for transmitting motion which is independent of load, environment, aging, temperature variations, and so forth.

In addition to the foregoing, the readily available nut 48 enables easy adjustment of the flow rate at which the switch will actuate without having to disassemble the entire switch structure. In addition, the novel cylindrical body defining a plurality of orifices greatly increases the various ranges over which the same flow switch structure can be utilized to the end that a single switch structure can be employed in a variety of applications wherein widely different flow rates are involved.

Finally, the provision of the visual indicating means in the form of the extended member from the U-shaped frame enables a very rapid monitoring of the mechanical condition of the switch so that any malfunctioning can be readily isolated to either the mechanical structure of the switch itself or the electrical portion of the circuit.

It is clear, accordingly, that the present invention has fully satisfied all of the various objects set forth heretofore.

While one application of the invention has been described in conjunction with controlling cooling fluid flow rate, it will be evident to those skilled in the art that there will be many more applications for the flow responsive switch of this invention.

What is claimed is:

1. A flow responsive switch means for insertion in a fluid flow line comprising, in combination: a fluid enclosure having an inlet and outlet for connection into said flow line; orifice means in said enclosure dividing said enclosure into first and second chambers and defining an orifice through which said fluid passes; means in said enclosure responsive to a change in the differential pressure between said first and second chambers as a consequence of a change in the flow rate of fluid through said orifice to a given flow rate for effecting a physical movement in said enclosure; a switch positioned exterior of said enclosure; and motion transmitting means including first and second arms, said first arm being within said enclosure and responsive to said physical movement and said second arm being exterior to said enclosure for operating said switch, said arms being connected together through a portion of a wall defining said enclosure for transmitting through a rocking action said physical movement to said switch to thereby actuate said switch, said rocking action taking place about a pivot point in said portion of said wall.

2. A flow responsive switch according to claim 1, in which said orifice means includes a restricted portion between said first and second chambers defining a single opening and a cylindrical body having a plurality of orifice openings of different sizes circumferentially spaced along a middle portion of one wall of said cylindrical body, the diametrically opposite wall defining a large open area, said cylindrical body being received in said enclosure with said one wall engaging said restricted portion such that rotation of said cylindrical body about its own axis enables positioning of any one of said plurality of orifice openings in registration with said single opening, whereby the differential pressure between said first and second chambers is adjustable for different flow rates to thereby enable adjustment of said given flow rate at which said physical movement takes place.

3. A flow responsive switch according to claim 1, in which said means responsive to a change in the flow rate of said fluid includes a diaphragm within said enclosure positioned such that opposite sides are subject respectively to the fluid pressures in said first and second chambers so that said diaphragm moves in response to a change in said differential pressure, said first and second arms defining a U-shaped frame structure, an end of said first arm being coupled to said diaphragm, the base of said U constituting the connection of said arms passing through said wall portion of said enclosure; an annular resilient sealing means surrounding said base at the point it passes through said wall to provide a fluid seal while permitting rocking movement of said U-shaped frame member in its own plane, said second arm having its outer end portion positioned to engage said switch; and a biasing means urging said second arm with a given force in a direction to actuate said switch, said second arm being restrained from movement by said diaphragm and first arm, a decrease in fluid flow rate below a given value resulting in movement of said diaphragm in a direction to cause said second arm to engage and actuate said switch.

4. A flow responsive switch according to claim 3, including indicating means extending from said U-shaped frame for indicating the rocked position of said frame and thereby provide an indication of the position of said diaphragm.

5. A flow responsive switch according to claim 3, including means connected to said biasing means to enable adjustment of said given force whereby the value of said given flow rate at which said switch is actuated may be adjusted.

6. A flow responsive switch according to claim 5, including means providing a visual indication of the degree of adjustment of said biasing means.

References Cited

UNITED STATES PATENTS

| | | | |
|---|---|---|---|
| 409,375 | 8/1889 | Simons | 200—83 |
| 2,266,205 | 12/1941 | Hunter | 200—83 |
| 2,719,889 | 10/1955 | Miller | 200—81.9 |

BERNARD A. GILHEANY, *Primary Examiner.*

H. BROOME, *Assistant Examiner.*